US012452670B2

(12) United States Patent
Bhandari et al.

(10) Patent No.: US 12,452,670 B2
(45) Date of Patent: Oct. 21, 2025

(54) SYSTEMS AND METHODS FOR SECURE CONNECTIONS AND DATA TRANSFER

(71) Applicant: Starten Systems, Inc., Andover, MA (US)

(72) Inventors: Anil Kumar Bhandari, Andover, MA (US); Armin Buhay Cao, Hudson, NH (US); Ashraf Mansur Dahod, Andover, MA (US); Matthew Hayden Harper, Hollis, NH (US); Vijay Kumar Kathuria, Middleton, MA (US); Kenneth Edward Virgile, Lexington, MA (US)

(73) Assignee: Starten Systems, Inc., Andover, MA (US)

( * ) Notice: Subject to any disclaimer, the term of this patent is extended or adjusted under 35 U.S.C. 154(b) by 0 days.

(21) Appl. No.: 18/496,739

(22) Filed: Oct. 27, 2023

(65) Prior Publication Data

US 2025/0142336 A1    May 1, 2025

(51) Int. Cl.
*H04W 12/08* (2021.01)
*H04W 12/06* (2021.01)
*H04W 12/084* (2021.01)
*H04W 76/10* (2018.01)

(52) U.S. Cl.
CPC ......... *H04W 12/084* (2021.01); *H04W 12/06* (2013.01); *H04W 76/10* (2018.02)

(58) Field of Classification Search
CPC .... H04W 12/084; H04W 76/10; H04W 12/06
See application file for complete search history.

(56) References Cited

U.S. PATENT DOCUMENTS

| 11,425,564 | B2* | 8/2022 | Bhatnagar | H04W 76/12 |
| 11,902,823 | B1* | 2/2024 | Costa | H04W 28/0268 |
| 2019/0036924 | A1* | 1/2019 | Wang | H04W 76/10 |
| 2020/0163012 | A1* | 5/2020 | Zhu | H04W 12/06 |
| 2021/0112444 | A1* | 4/2021 | Papa | H04W 28/0289 |
| 2022/0053328 | A1* | 2/2022 | Eitoku | H04W 12/06 |
| 2022/0408502 | A1* | 12/2022 | Yu | H04W 76/16 |
| 2023/0080836 | A1* | 3/2023 | Vahidi Mazinani | H04W 60/06 455/435.1 |
| 2023/0156650 | A1* | 5/2023 | Salkintzis | H04W 12/08 455/435.1 |

(Continued)

OTHER PUBLICATIONS

3GPP TR 22.904 V17.0.0 Technical Specification, 3rd Generation Partnership Project; Technical Specification Group Services and System Aspects; "Study on user centric identifiers and authentication" (Release 17), Mar. 2022, 20 pages.

(Continued)

*Primary Examiner* — Khawar Iqbal
(74) *Attorney, Agent, or Firm* — ArentFox Schiff LLP

(57) ABSTRACT

The invention solves the problem of lack of consistency in the policy handling of cellular devices and non-cellular devices. Security credentials that are acceptable to the core network are enabled by the invention to be used for devices that do not have access to such security credentials. This results in consistency in how policy is handled, as it enables the core network to handle policy for all devices, regardless of whether they have access to acceptable security credentials. Acceptable security credentials may be SIM-based credentials or certificate-based credentials, or any acceptable type of security credentials.

10 Claims, 10 Drawing Sheets

Control Flow with Wi-Fi Access Network

(56) References Cited

U.S. PATENT DOCUMENTS

| | | | |
|---|---|---|---|
| 2023/0262642 A1* | 8/2023 | Li .................. | H04W 48/16 |
| | | | 455/435.1 |
| 2023/0353502 A1* | 11/2023 | Kanak ............. | H04L 63/0876 |
| 2023/0370841 A1* | 11/2023 | Gundavelli ....... | H04W 12/04 |
| 2024/0056793 A1* | 2/2024 | Rosa ................ | H04W 4/50 |
| 2024/0114338 A1* | 4/2024 | Wan ................. | H04W 12/06 |
| 2024/0129312 A1* | 4/2024 | Zhang .............. | H04L 63/20 |
| 2024/0129787 A1* | 4/2024 | Costa ............... | H04W 12/06 |
| 2024/0179525 A1* | 5/2024 | Li .................... | H04W 12/73 |
| 2024/0422535 A1* | 12/2024 | Balmakhtar ...... | H04W 12/40 |

OTHER PUBLICATIONS

3GPP TS 23.316 V18.1.0 Technical Specification, 3rd Generation Partnership Project; Technical Specification Group Services and System Aspects; "Wireless and wireline convergence access support for the 5G System (5GS)" (Release 18), Mar. 2023, 81 pages.

3GPP TS 23.501 V18.1.0 Technical Specification, 3rd Generation Partnership Project; Technical Specification Group Services and System Aspects; "System architecture for the 5G System (5GS)"; Stage 2 (Release 18), Mar. 2023, 207 pages.

3GPP TS 24.501 V18.2.1 Technical Specification, 3rd Generation Partnership Project; Technical Specification Group Core Network and Terminals; "Non-Access-Stratum (NAS) protocol for 5G System (5GS)"; Stage 3; (Release 18), Mar. 2023, 4 pages.

C. Rigney, "Radius Accounting", IEEE RFC 2866, Jun. 2000, 28 pages.

3GPP TS 33.501 V18.4.0 Technical Specification, 3rd Generation Partnership Project; Technical Specification Group Services and System Aspects; "Security architecture and procedures for 5G system" (Release 18), Dec. 2023, 326 pages.

International Search Report and Written Opinion issued in International Application No. PCT/US2024/053224, mailed Nov. 20, 2024, 7 pages.

* cited by examiner

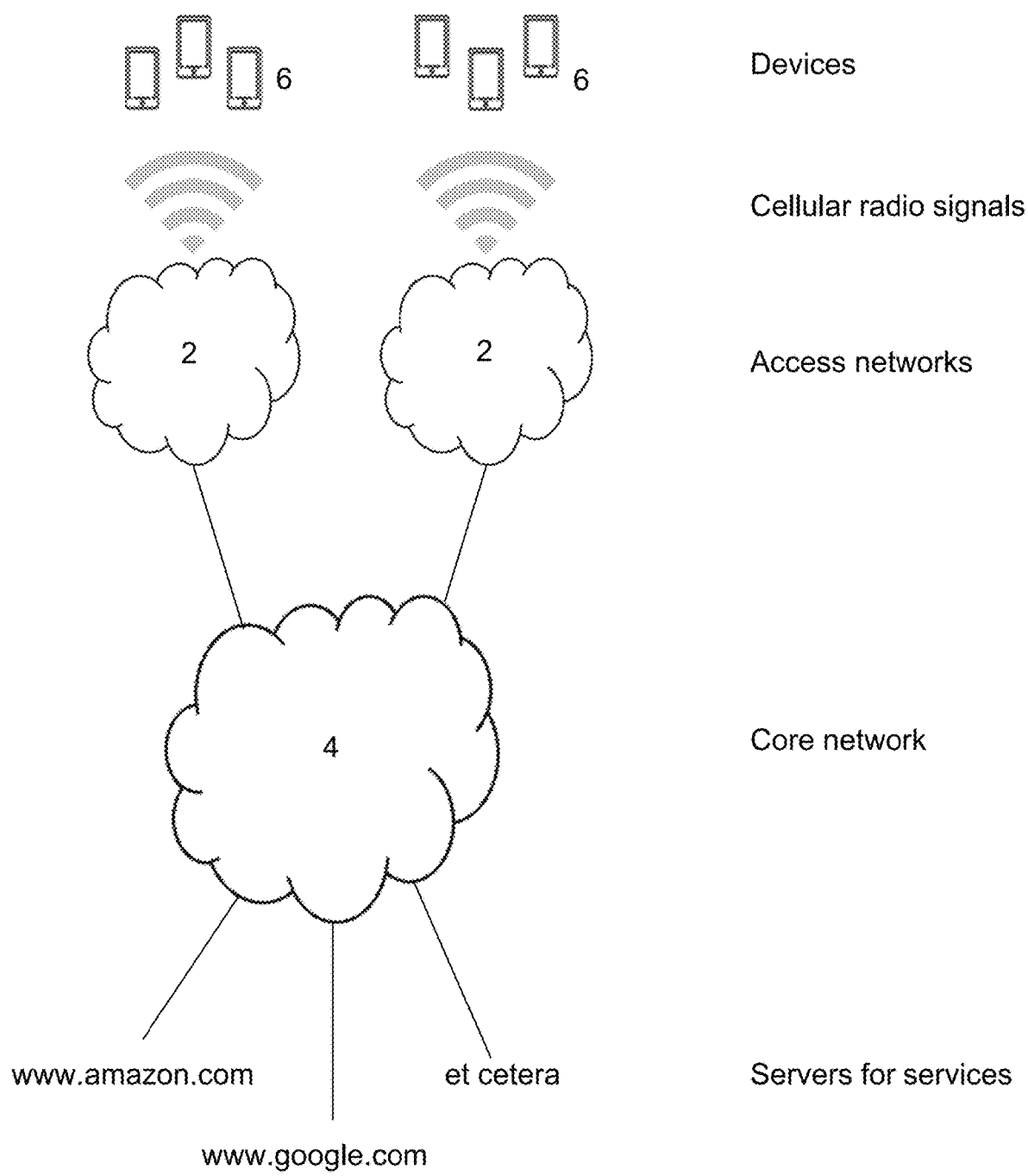
Figure 1. Cellular Network (prior art)

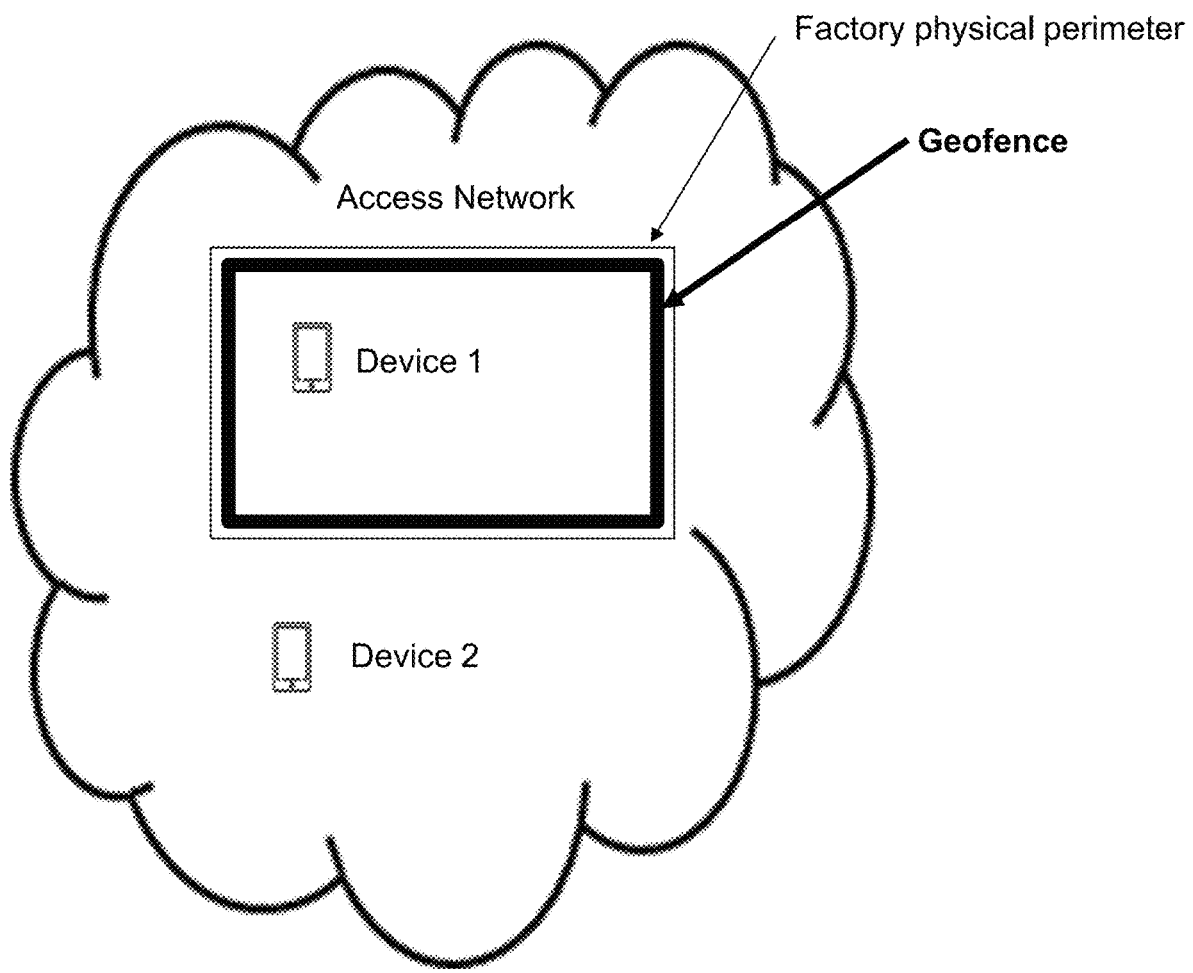
Figure 2: Access Network with Geofence

Access Technologies

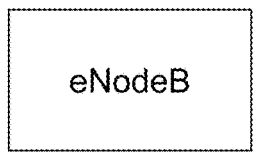
Each device performs NAS signaling with SIM credentials or certificates

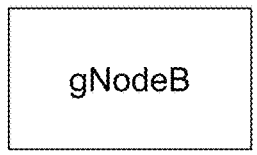
Each device performs NAS signaling with SIM credentials or certificates

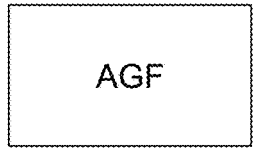
AGF performs NAS signaling without SIM credentials and without certificates for all connected devices

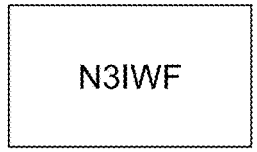
Each device performs NAS signaling with SIM credentials or certificates

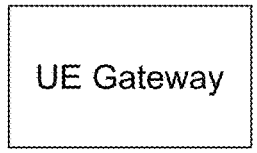
Performs NAS signaling with SIM credentials or certificates for all connected devices that do not have SIMs or certificates Figure 3. Comparison of Access Technologies

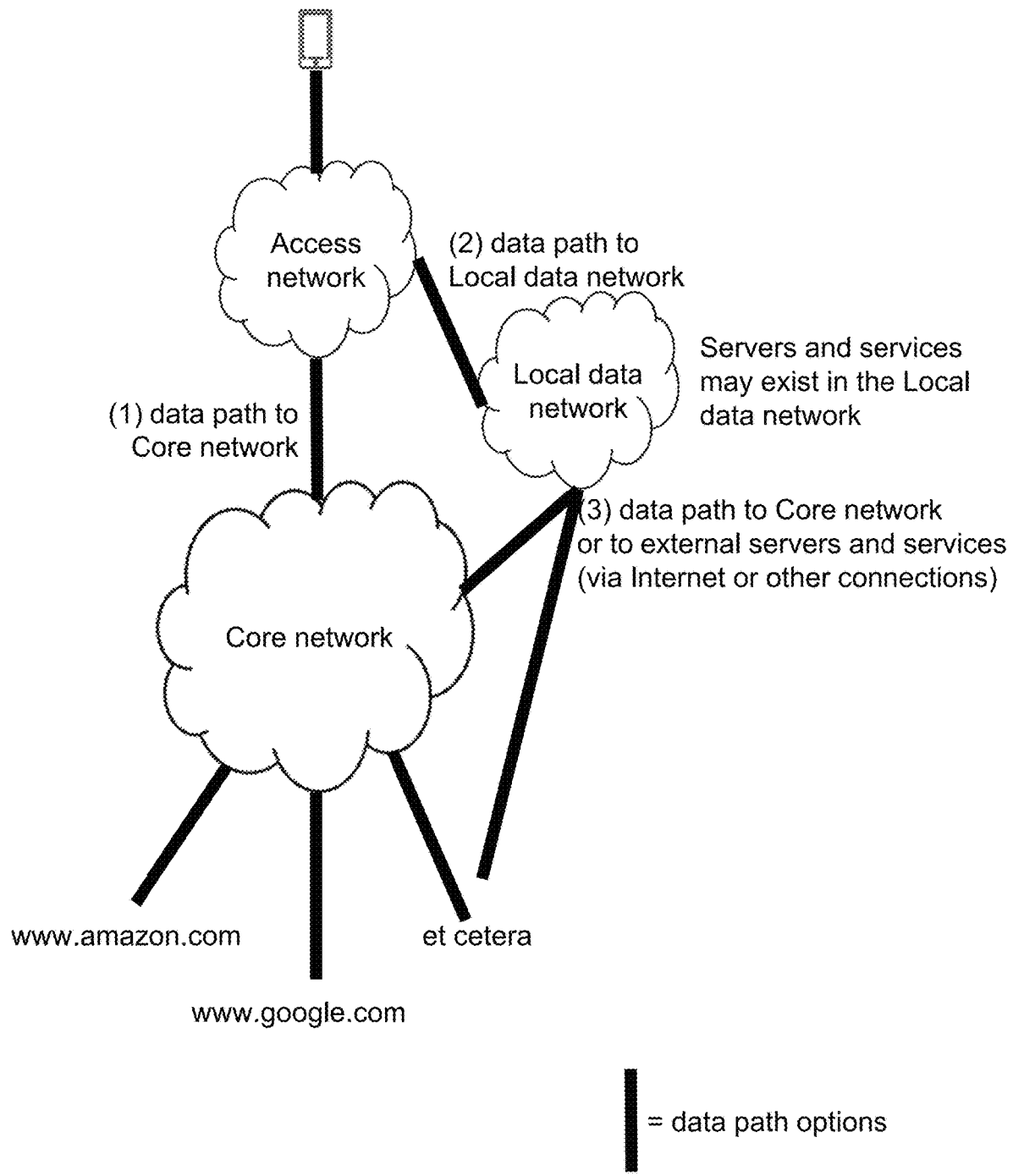
Figure 4. Data Paths

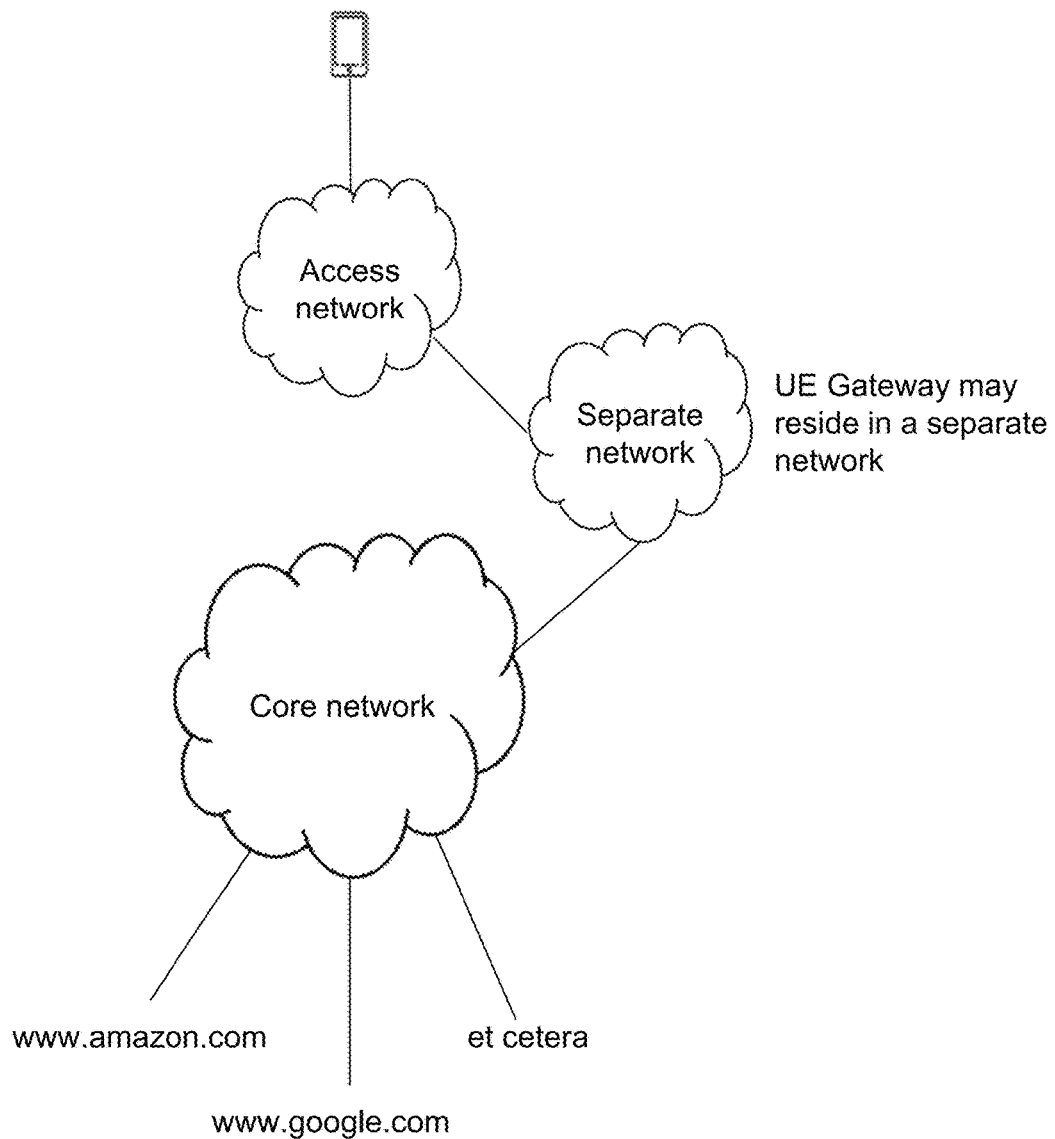
Figure 6. UE Gateway Outside the Physical Access Network

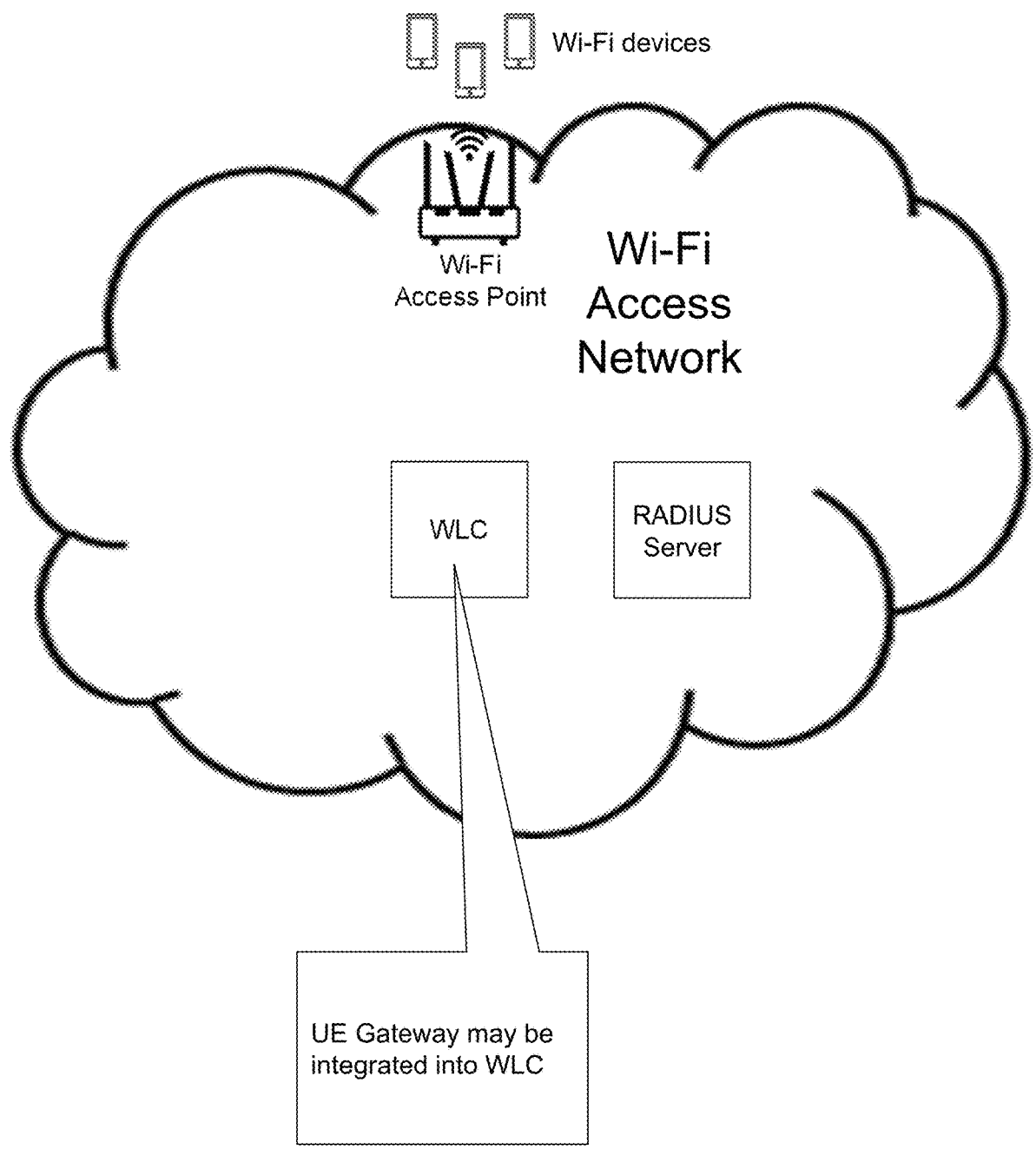
Figure 7. Wi-Fi Access Network

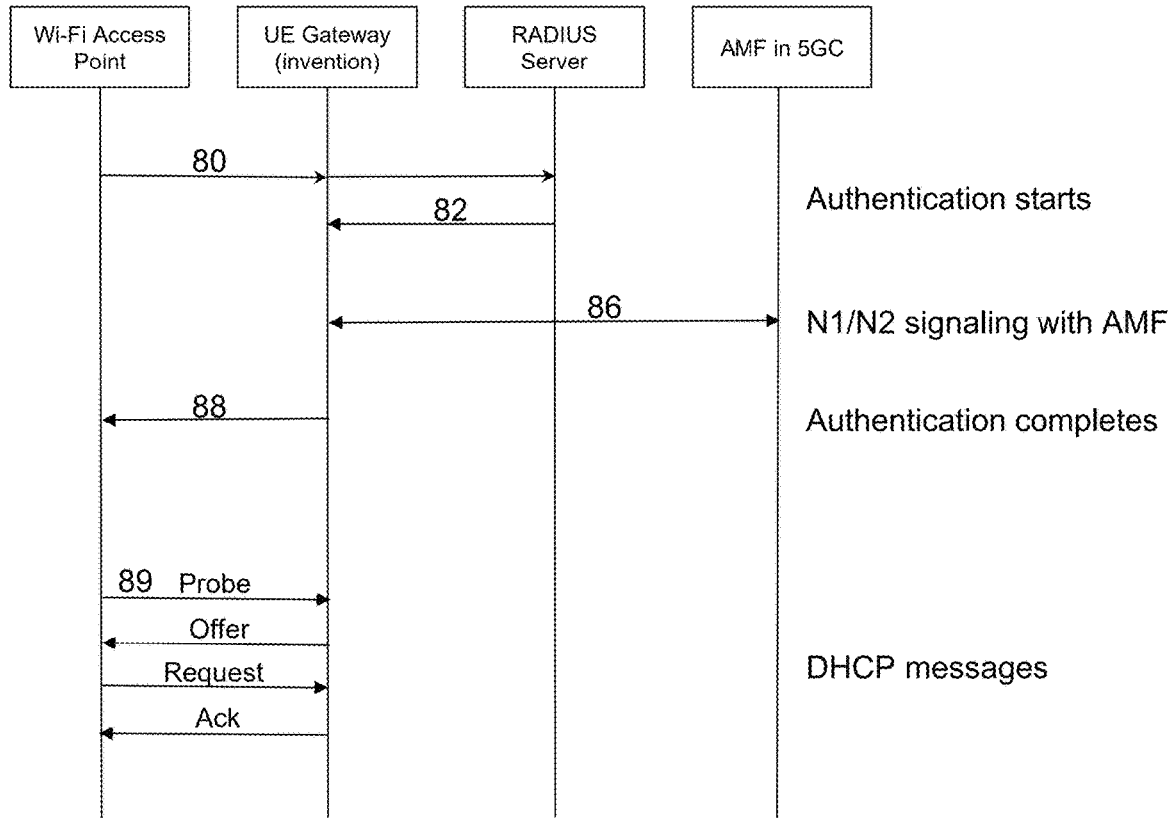
Figure 8. Control Flow with Wi-Fi Access Network

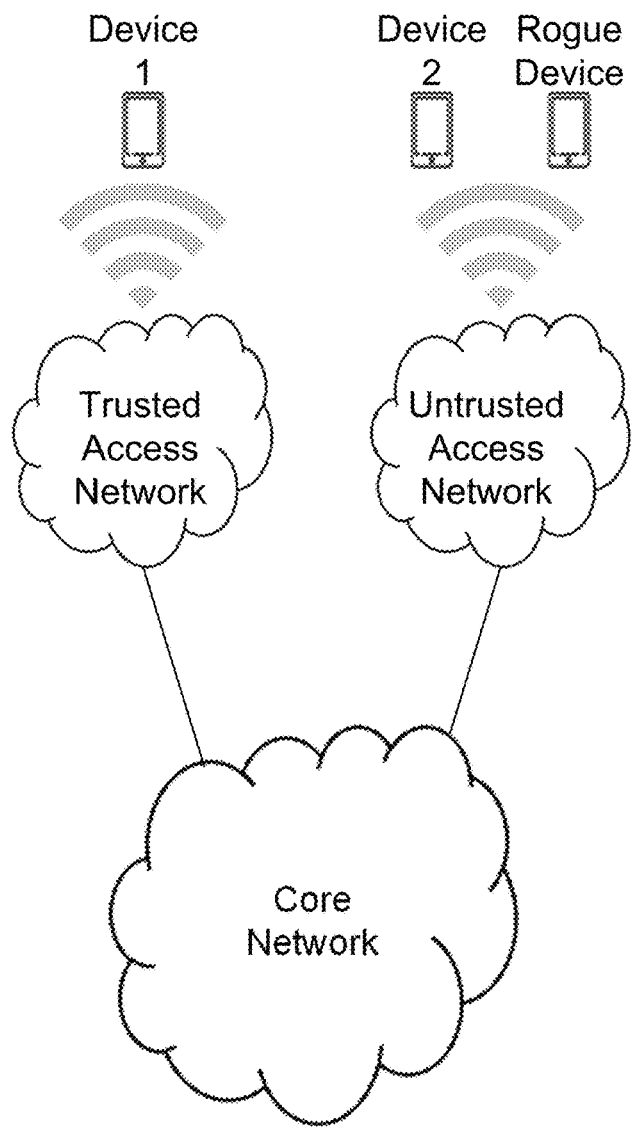
Figure 9. Trusted and Untrusted Access Networks

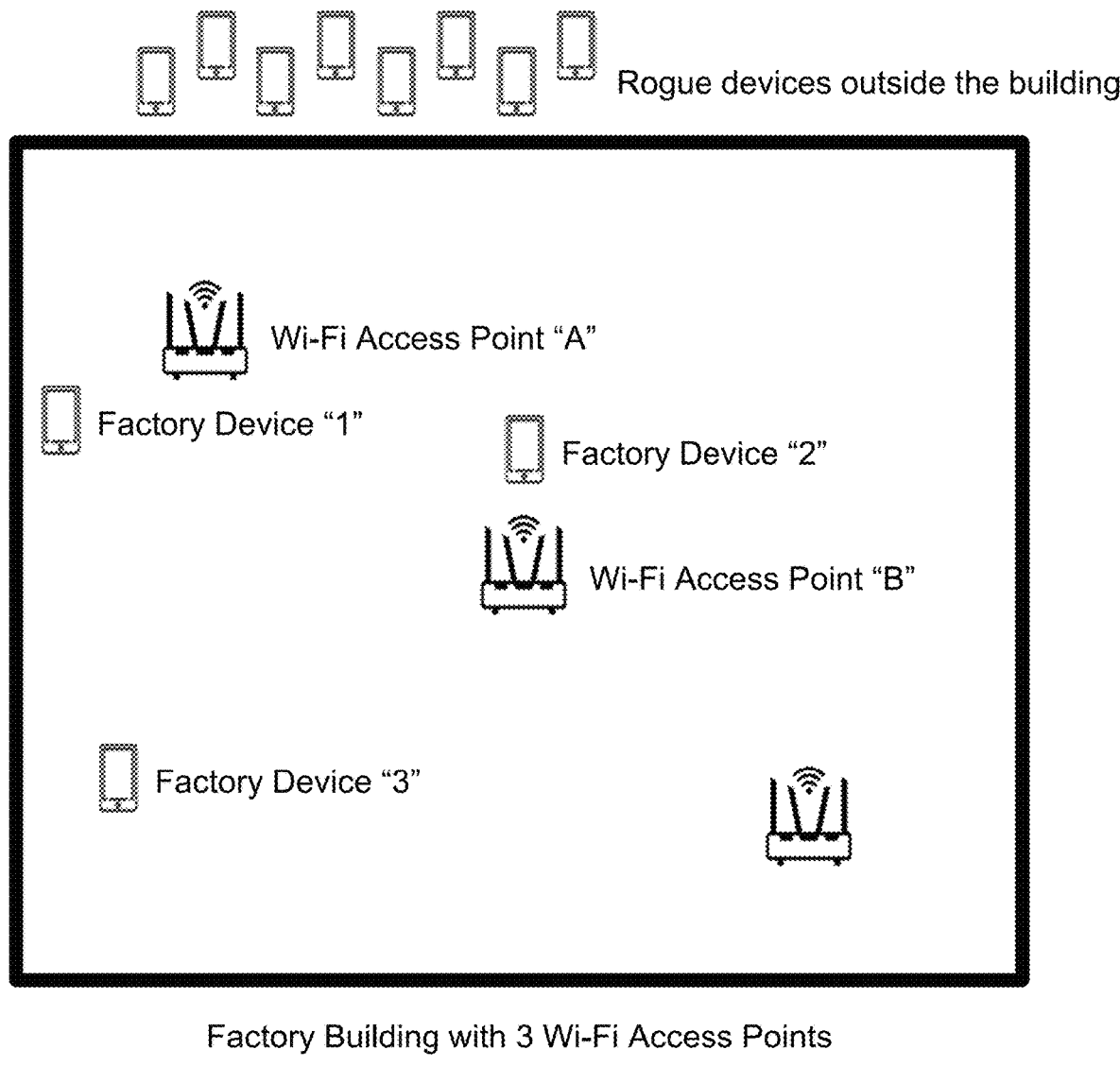
Figure 10. Wi-Fi Access Network in a Factory

SYSTEMS AND METHODS FOR SECURE CONNECTIONS AND DATA TRANSFER

TECHNICAL FIELD

This invention relates to the connection of non-cellular devices to cellular networks. It relates more specifically to associating a cellular-network device identifier and security credentials with a device, without additional involvement of the device itself.

BACKGROUND

FIG. 1 shows a typical cellular network. The cellular network includes of cellular radio access networks 2 and a core network 4. A cellular radio access network typically includes cell towers and base stations. The types of the cellular radio access network equipment depend on the technology. For example, a 4G cellular radio access network (aka an LTE access network) uses eNodeBs for its base stations, while a 5G cellular radio access network uses gNodeBs for its base stations.

The type of core network equipment also depends on the technology. The most recent 3GPP standards for a core network are for 5GC (5G Core). Cellular radio access networks connect to core networks. Interoperability between different versions of cellular radio access networks and core networks is typical. Cellular devices 6 connect via a cellular radio access network to a core network. Services (e.g., servers associated with www.amazon.com) typically connect to the core network without using a cellular radio access network.

FIG. 1 illustrates the high level structure of a cellular network, although many variations exist. In particular, many cellular networks today may be a private network in part or completely. A private network is a non-public network that is intended for non-public use. And a core network may exist without any cellular radio access network, by using other technologies for the access networks, such as Wi-Fi.

Security over cellular networks is important. A major aspect of security is for data transmissions to be encrypted, where only the intended destination of the data is capable of decrypting the data transmission. A key is used to perform the encryption. The key and sender identity are authenticated using additional security credentials. Two common forms of the additional credentials are for the additional credentials to be in a SIM (Subscriber Identity Module) or in a digital certificate.

A SIM may be inside many different types of devices, and it most commonly inside a cell phone. SIMs can be easily replaced by device owners. Some devices use a programmable SIM, called an eSIM (embedded SIM) or a UICC (Universal Integrated Circuit Card, commonly referred to as a "SIM card") or an iSIM (integrated SIM) that is not removable from the device. Those SIMs are programmed with the credentials before the devices can connect to a cellular network (except the programming sequence itself might be performed using the cellular network). Some devices may use a SIM that is externally connected to the device, e.g., the SIM is contained in a small module that connects via a USB cable to the device. In this patent, subsequent use of the acronym SIM refers to any form of a SIM described above (e.g., SIM, eSIM, et cetera).

A digital certificate is an electronic document used to prove the validity of a key. The certificate includes information about the key, information about the identity of its owner (called the subject), and the digital signature of an entity that has verified the certificate's contents (called the issuer). If the signature is valid, and the software examining the certificate trusts the issuer, then it can use that key to communicate securely with the certificate's subject.

A device that connects to a cellular network is often called a UE (User Equipment). Cell phones are a common type of UE. A UE uses its security credentials to connect to a cellular network, typically using the security credentials from its SIM, although 3GPP standards allow UEs to use other security credentials (such as digital certificates) when connecting to a private cellular network.

In addition to cellular radio access networks, a wired network may be used to connect devices to the core network. There may be multiple layers of wired networks, with a gateway known as an AGF (Access Gateway Function) ultimately connecting to the core network. Devices on the wired network do not have SIMs, and so alternate credentials are used for network authentication. The alternate credentials are typically less secure than SIMs, and are more difficult to manage. If the access network is trusted by the operator of the core network, the operator would permit the alternate credentials to be less secure.

Additional access networks exist, such as Wi-Fi access networks. A device with security credentials might connect via a Wi-Fi access network. Part of that connection process may include the Wi-Fi access network forwarding the device's security credentials to the core network for authentication. Such could be performed by the device using the Wi-Fi access network to connect to an N3IWF (Non-3GPP Inter-Working Function), which is designed to forward the device's security credentials to the core network.

Indoor factories often have wireless sensor networks, such as WirelessHART and ISA100.11a. Ultimately, the wireless sensor networks use a gateway like a Wi-Fi gateway, and so Wi-Fi becomes the access network to reach the core network.

Parts or all of a cellular network can be a private cellular network. 3GPP standards allow for additional methods for devices to be authenticated on private cellular networks. One highly secure such method is for a device to use the EAP-TLS protocol with a digital certificate, when the device authenticates with the core network.

Modern enterprises often require device connectivity both outdoors and within a factory. A cellular radio access network connecting to a core network might provide sufficient connectivity for devices that are outdoors. Such a type of network can be problematic inside a factory. An indoor cellular radio access network can be expensive, and the devices that reside indoors often lack the capability to connect to a cellular radio access network.

One solution to providing both outdoor and indoor connectivity, would be to have a cellular radio access network outdoors, and use a technology like Wi-Fi for indoors; however, such a solution creates a consistency problem. A device that connects to the cellular radio access network supplies the credentials of the device's SIM for the operator of the cellular network to determine the applicable policy for the device. Policy consists of authentication, authorization and accounting. Authentication is the process of verifying that the device is actually the device, and not a rogue device impersonating the actual device. Authorization is the process of determining what network capabilities may be allowed for the device. Accounting is determining how billing is to be performed for the device's usage of the network.

When indoors, a device might connect to a network using a technology like Wi-Fi. If a device has no SIM, then a method using something other than SIM credentials must be used for obtaining device policy. Using such a method results in inconsistency in policy control/management with how policy control/management is performed when policy is based on SIM credentials. An enterprise server might perform policy control/management for an indoor Wi-Fi network, while a cellular operator might perform policy control/management for the cellular network.

If the outdoor connectivity is for a private cellular network, then a good solution for indoor devices can be for the indoor devices to use EAP-TLS with digital certificates, since the operator of the private cellular network may be able to also manage the certificates and associated policies. However, not all indoor devices are capable of using EAP-TLS or having access to digital certificates.

If a device does not have a SIM or is not capable of executing EAP-TLS with a digital certificate, then the device would not have UE software capable of NAS (Non-Access Stratum) signaling. The device could connect to a non-cellular-radio access network, which could also connect to a core network. However, in this situation there would be no UE software using highly secure credentials like those contained in a SIM or digital certificate for NAS signaling for authentication/authorization with the core network, and there would be no distribution of accounting policy for the device according to the security credentials.

Using SIM credentials is highly secure. Using EAP-TLS with digital certificates is highly secure. Other current security methods are less secure. As one example of a less secure method, consider security based on username/password. That security is compromised as soon as an intruder learns the username/password. Highly secure connections is a requirement of most cellular networks.

Geofencing technology can be used to improve security for connecting to an access network. Refer to FIG. 2. Barring other restrictions, without a geofence both Device 1 and Device 2 would be allowed to connect to the access network. Note the physical perimeter of the factory, and the logical geofence. With geofencing technology as part of the access network, the access network could be configured to only allow access by devices that are inside of the geofence. In that scenario Device 1 could connect to the access network, but Device 2 would not be permitted to connect. This would prevent rogue devices that were outside of the factory from connecting to the access network.

SUMMARY

In one aspect of the invention, new functionality is enabled by a UE Gateway. The name "UE Gateway" is used here to specify new functionality. To the extent that phrase is used or described in other documentation or publications, the phrase is not meant to imply any functionality other than describe herein. Typically, the cellular network operator has a subscription record of the UE that is kept in the core network. The UE Gateway enables devices that are not UEs to connect to the cellular network. The UE Gateway may have many SIMs—each SIM has a subscription record in the core network. An Enterprise may have corporate cell phones with SIMs that connect to a cellular network. That Enterprise may also have Wi-Fi laptops that connect to the Enterprise's Wi-Fi network. The UE Gateway enables seamless connection of the corporate cell phones and corporate laptops to the same network.

In cellular 5G, all data networks (for a UE's particular connection to the cellular network) that are reachable by the UE are accessed via a UPF (a node defined by 3GPP, which could be located in the Enterprise). The corporate cell phones would automatically use that UPF (that would be how the corporate cell phones are configured for accessing a cellular network). Regarding corporate Wi-Fi laptops, the UE Gateway would associate one of its SIMs with a corporate Wi-Fi laptop and connect that laptop to the cellular core, which would then connect to that same UPF for what the core "thinks" is a UE, as further explained below So, all corporate cell phones and laptops would have access to the same data network.

The Wi-Fi laptop is not a UE—it cannot connect directly to a cellular network. The UE Gateway does not transform the laptop into a UE, but instead the UE Gateway simulates the Wi-Fi laptop as a UE such that the laptop appears to the core network as a UE. The UE Gateway remembers which of its core-simulated UEs is associated with which laptop.

One illustrative embodiment of the invention solves the problem of lack of consistency in the policy handling of cellular devices and non-cellular devices. Security credentials that are acceptable to the core network are enabled by the invention to be used for devices that do not have access to such security credentials. This results in consistency in how policy is handled, as it enables the core network to handle policy for all devices, regardless of whether they have access to acceptable security credentials. Acceptable security credentials may be SIM-based credentials or certificate-based credentials, or any type of security credentials that may be accepted in the future.

SIM credentials are enabled by the invention for devices that have no SIMs, so there can be consistency in how policy is handled for both devices with SIMs and for devices without SIMs. Alternatively, digital certificates are enabled for devices that do not have access to digital certificates, so there can be consistency in how policy is handled for both devices with access to digital certificates and for devices without access to digital certificates.

In prior networks, a device with a SIM would also have UE software. The device would connect to a cellular radio access network, and the UE software would use the credentials in the SIM to perform NAS signaling. The cellular radio access network would have connections to the core network, and relay the NAS signaling with the SIM credentials to the core network. The core network would authenticate the connection, and authorize the appropriate capabilities for the device regarding access to the core network and possibly other networks. The core network may inform the relevant network components of the accounting policy to be used for the device. Also, a device with access to a digital certificate, could use NAS signaling to execute the EAP-TLS protocol with the digital certificate, which would be relayed to the core network. Then the core network would authenticate and authorize, and could provide accounting policy.

According to an illustrative embodiment of the invention, a device does not have UE software to perform NAS signaling and nor does the device have security credentials that would be accepted by the core network. When such a device connects to the non-cellular-radio access network, the invention associates a set of security credentials with the device, and the UE Gateway uses its UE software to perform the NAS signaling with the core network. The core network uses those security credentials to authenticate the connection, and to authorize the appropriate capabilities for the device. The core network may use those security credentials to distribute the accounting policy to the relevant network equipment. The authorized capabilities are not limited to the device activity. The capabilities may include how the data path through the networks is handled. The information returned by the core network may be used to inform parts of the access network to perform different QoS treatments and/or QoS enforcement on the different data paths through the access network. Or the information may be used to permit/deny access by the device to servers or services within the data network.

In accordance with another illustrative embodiment, the processes and systems disclosed herein also can control when to disconnect those connections with the core network that it had established.

According to another illustrative embodiment, the processes and systems disclosed herein also enable additional security for access networks, which is important when devices do not use NAS signaling with security credentials to connect to the core network via an access network. This is achieved without the increased cost and complexity of using geofencing technology, and with options not available in current geofencing offerings.

BRIEF DESCRIPTION OF THE DRAWINGS

FIG. 1 depicts a typical cellular network. Devices connect via cellular radio signaling to access networks, which connect to a core network. The core network has connections to servers providing services like www.amazon.com.

FIG. 2 depicts an access network with a geofence.

FIG. 3 depicts a comparison of several different access network technologies, depicting how one illustrative embodiment of the invention differs from approaches that use existing access network technologies.

FIG. 4 depicts multiple data paths that a device may use in accordance with one embodiment of the invention.

FIG. 6 depicts one illustrative embodiment of the invention in which the UE Gateway is located outside of the physical access network.

FIG. 7 depicts one illustrative embodiment of the invention applied to a Wi-Fi access network.

FIG. 8 depicts control signaling to connect one access network example to a core network according to one illustrative embodiment of the invention.

FIG. 9 depicts a Trusted access network and an Untrusted access network in accordance with one illustrative embodiment of the invention.

FIG. 10 depicts portions of a Wi-Fi access network within a factory building in accordance with one illustrative embodiment of the invention.

DETAILED DESCRIPTION

Figure 5:
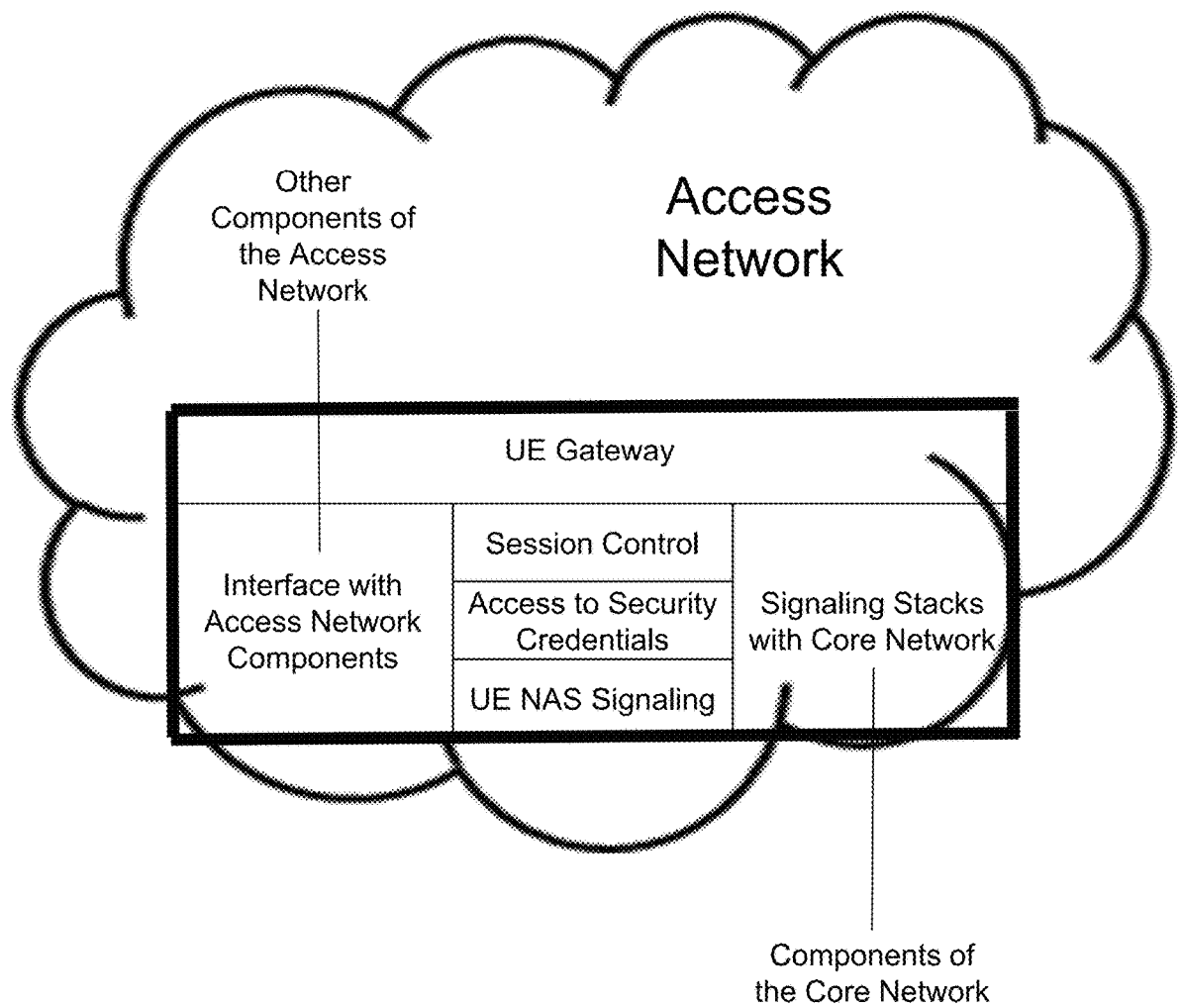
FIG. 5 depicts the major components of one illustrative embodiment of the invention.

One illustrative embodiment of the invention described herein is an inventive UE Gateway to provide security credentials on behalf of network devices, even when the devices do not have a dedicated SIM or digital certificate. FIG. 3 illustrates a comparison of different access technologies with the inventive UE Gateway functionality. Note that NAS signaling is what conveys the SIM credentials to the core network. Similarly, NAS signaling can be used to execute the EAP-TLS protocol that includes the conveying of certificates. More protocol details are included below, to explain the operation of the invention.

When a device without a SIM connects to the access network, the UE Gateway associates the device with SIM credentials and executes the UE software to perform NAS signaling to achieve authentication/authorization with the core network, as well as, optionally, an accounting policy to be used for the device. The authorized capabilities can be used to control the data path of the device, including the device's access to the core network, access to the device through the access network and the device's access to data networks.

FIG. 4 depicts multiple data path options for the network device, showing (1) data path to core network with connections to external servers and services, and (2) data path to a local data network that may have local servers and services, and (3) data path to a local data network that connects to the core network and/or external servers and services.

Alternatively, when a device without access to a digital certificate connects to the access network, a digital certificate is associated with the device by the inventive UE Gateway, which utilizes its UE software to perform NAS signaling to get authentication/authorization with the core network, as well as, optionally an accounting policy to be used for the device.

In one preferred embodiment the foregoing functionality is performed in a UE Gateway that executes UE software. The UE Gateway can be implemented independently as software running on a stand-alone computer or integrated with other components of the access network. FIG. 5 shows one illustrative embodiment of the UE Gateway. Additional software exists in the UE Gateway that is not shown, such as, for management of the UE Gateway.

UE Gateway functionality does not have to be physically part of the access network. It can be part of a different physical network that provides a logical extension to the physical access network. For example, FIG. 6 illustrates the UE Gateway being present in a physical network that is separate from the physical access network.

In one embodiment, the UE Gateway has access to a bank of security credentials (as shown in FIG. 5). A bank has one or more sets of security credentials. There are a number of ways to implement the bank of security credentials.

The bank of security credentials could be SIMs (or other varieties of SIMs, such as eSIMs) that are attached to a piece of hardware that is connected to the UE Gateway either locally or remotely. The bank of security credentials could be a disk file that contains the credentials. The bank of security credentials could be a memory file that contains the credentials. Additional forms of storing the bank of security credentials are possible.

The bank of security credentials could be digital certificates that are attached to a piece of hardware that is connected to the UE Gateway either locally or remotely. The bank of security credentials could be a disk file that contains the credentials. The bank of security credentials could be a memory file that contains the credentials. Additional forms of the bank of security credentials are possible.

When a device without core-network-acceptable security credentials (such as an off-the-shelf commercial laptop that has a Wi-Fi adapter but no cellular adapter) is connecting to the access network, the UE Gateway is informed of the connection process. For example, the access network might be a Wi-Fi network. FIG. 7 depicts a Wi-Fi access network. Typical components in a Wi-Fi access network include one or more Wi-Fi Access Points and a controller for the access network, often called a WLC (Wireless LAN Controller). Authentication and authorization for devices to connect to the Wi-Fi access network is often controlled by a RADIUS server. As noted in FIG. 7, the UE Gateway may be integrated in to the WLC.

FIG. 8 shows one illustrative embodiment of control signal processing utilized by the present invention. When the device is connecting to a Wi-Fi Access Point, that Access Point sends a RADIUS message to the RADIUS server with information about the device's attempt to connect to the Access Point. The Access Point is configured to have the UE Gateway be a proxy for the RADIUS server. Then the RADIUS message 80 would go from the Access Point to the UE Gateway, and the UE Gateway would forward the message to the RADIUS server. The response 82 (authentication approval or rejection) would go from the RADIUS server to the UE Gateway. If approved, the UE Gateway would send a message 88 informing the Access Point that the authentication was approved. Before informing the Access Point, the UE Gateway would determine if security credentials had already been associated with the device by the UE Gateway, or if no security credentials had been associated.

If no security credentials were associated with the device, then the UE Gateway would create an association. If there already was an association, then the UE Gateway would further determine if the UE Gateway already had a connection to the core network for those credentials.

When the device began its connection processing, the device provided an identifier of the device, such as its MAC address, or a username/password. When the UE Gateway does its connection processing on behalf of the device, the UE Gateway uses a device identifier that differs from the device-supplied identifier, and the UE Gateway uses additional security credentials that are associated with such identifier by the core network's authentication/authorization system.

If there was no current connection to the core network for those credentials, the UE Gateway would establish a connection. If the core network is a 5GC, the connection establishment would have the UE Gateway use 3GPP standard N1/N2 signaling 86 with the AMF (Access and Mobility Management Function) of the 5GC, which includes the UE NAS signaling with the AMF. Part of the 3GPP standard signaling would have the 5GC return one or more IP addresses for the device to use. The IP addresses are saved by the UE Gateway for a later step.

After successful connection to the core network, the UE Gateway would forward the "RADIUS Authentication approval" message 88 to the Access Point. Continuing with this example of an access network, the UE Gateway and Access Point would have agreed to a data path between each other, for data messages from/to the device. The device would then begin DHCP data path messages 89, which the Access Point would forward to the UE Gateway. The UE Gateway would assign the saved IP addresses to the device.

The UE Gateway uses the 3GPP standard N2 signaling to define a 3GPP standard N3 data path connection to the UPF (User Plane Function) of the 5GC. Subsequent data messages from the device would go to the Access Point, then to the UE Gateway and then to the UPF. Similarly, data messages for the device would come from the UPF, to the UE Gateway, and then to the Access Point for delivery to the device.

The above sequence of steps/messages is dependent on the type of access network and the particular equipment in the access network. Variations will exist according to the particular access network used, however this illustrative embodiment includes the following steps executed by the UE Gateway: accessing a bank of security credentials, associating a device with a set of security credentials and a new device identifier, signaling with the core network, and transferring data between the device and the network node that provides access to the data network (e.g., a UPF in 5G).

While the UE Gateway may decide upon the association of a device with a set of security credentials, an alternative would be for that association to be performed with outside assistance. For example, a human operator or a computer program could inform the UE Gateway of an association between a device and a set of security credentials.

A significant variation in the architecture of a cellular network is present in private cellular networks. In one example, the entire cellular network might be public, except the cellular operator may have deployed the UPF on customer premises as a private UPF for the customer. In that scenario, the data paths would include devices, access networks and the UPF on the customer premises, instead of the data path including the core network. In the private UPF example, the private UPF could be part of the local data network illustrated in FIG. 4.

According to another embodiment of the invention, the UE Gateway is able to use the authorization by the core network to affect the data path in the access network. The UE Gateway may use multiple data paths for the device to/from the UPF. For example, each data path may use a different QoS, since each data path may have a different type of traffic. The UE Gateway may communicate with other equipment in the access network, so that multiple data paths with different QoS treatments are established in the access network for the device.

The authorization by the core network may include permit/deny privileges for any servers or services, such as those listed in FIG. 4. The UE Gateway could be the entity in the access network that permits or denies the access, according to the authorization policy it received from the core network.

An accounting policy may be returned by the core network to the UE Gateway, as part of the process for authentication/authorization with the core network. The accounting policy may be used by the UE Gateway, and/or communicated to other network equipment in the data path of the device. For example, the accounting policy may restrict the device to only prepaid access, and the UE Gateway may communicate with a prepaid server to ensure that the device does not exceed its prepaid quota. As another example, the accounting policy may be for the UE Gateway to create records of the device's activity and send the records to a server that creates billing information.

Besides connecting devices to the core network and possibly affecting the data path of devices, another embodiment of the invention includes disconnecting devices from the core network. In the 5GC example from above, disconnection uses standard 3GPP signaling on the N1/N2 interfaces with the core network; however, additional functionality is needed to decide when to perform the disconnect signaling with the core network.

The "when to disconnect" logic of the UE Gateway is dependent on the type of access network and the particular access network equipment. The access network might inform the UE Gateway that the device has disconnected from the access network. The UE Gateway can decide to immediately perform a disconnect procedure from the core network, regarding the connection that the UE Gateway had established using the set of security credentials on behalf of the device to connect to the core network.

Alternatively, the UE Gateway may decide to wait before performing that disconnect, in case the device quickly re-connects to the access network. This alternative is particularly beneficial when a device quickly repeats connect/disconnect from the access network. For example, in Wi-Fi access networks, a Wi-Fi device must disconnect from its currently connected Access Point, before the device can connect to a different Access Point. The UE Gateway would be notified that the device is connecting to a different Access Point, and by waiting instead of performing the disconnect from the core network, the UE Gateway would have avoided the disruption caused by disconnecting/reconnecting with the core network.

Additional "when to disconnect" logic is part of the UE Gateway. For example, the UE Gateway may determine that its communication with a portion of the access network has been lost, and the UE Gateway may then decide to terminate all connections to the core network that were for devices connected to the portion of the access network where communication had been lost.

Specific examples of the "when to disconnect" logic include the following scenario, called a "RADIUS accounting scenario". The access network is Wi-Fi, including a Wi-Fi Access Point that is configured to send RADIUS accounting messages, and the Wi-Fi Access Point is also configured to use the UE Gateway as a RADIUS Proxy.

In the RADIUS accounting scenario, if the UE Gateway receives a RADIUS Accounting Start message to cause accounting data recording to begin for a connected device, the Access Point should send subsequent accounting messages, such as RADIUS Accounting Interim or RADIUS Accounting Stop. If RADIUS Accounting Interim or RADIUS Accounting Stop messages are not received within an expected time frame, the UE Gateway may assume that the Access Point is defective and the UE Gateway may disconnect the device from the core network.

Also in the RADIUS accounting scenario, if the UE Gateway receives RADIUS Accounting Off, the UE Gateway may assume that all devices that were connected to the Access Point are now disconnected from the Access Point. The UE Gateway may start a timer to see if any such devices reconnect, and upon timer expiry, disconnect all devices from the core network that have not reconnected to the access network.

Regarding the security of an access network, the access network may be Trusted or Untrusted, as shown in FIG. 9. In a Trusted access network, only legitimate devices can attach. Preferably, the Trusted access network only supports highly secure connection methods. Alternatively, there is physical security, e.g., devices cannot be brought within range of the Trusted access network until after the devices have been inspected and determined to be legitimate. Device 1 in FIG. 9 is capable of connecting to the Trusted access network.

In an Untrusted access network, devices using less than highly secure methods may connect to the Untrusted access network, such as Device 2 in FIG. 9. A Rogue Device attempts to impersonate Device 2 and connect to the Untrusted access network and the core network. According to one illustrative embodiment, the a functionality is invoked that hinders rogue devices from being able to connect to an access network, without requiring modification to the devices themselves. The functionality is part of the access network, which could be configured within the access network by the UE Gateway, or by multiple other means.

In one illustrative embodiment, a device uses its MAC address as the sole identifier for itself for establishing a connection to an access network. Typically, the access network would authenticate/authorize the connection to the access network according to whether that MAC address was permitted to connect. However, it is not difficult for a rogue device to spoof its MAC address when connecting to an access network. Thus, the prior art connection method offers no protection against a rogue device impersonating a legitimate device by using a spoofed MAC address to connect to the access network.

This embodiment addresses this problem using capabilities of the access network. Instead of the access network being configured to simply permit/deny connection for a specific MAC address, additional protection is provided. The point within an access network where a device connects to the access network, is referred to as the "access point". Note that for Wi-Fi access networks, the access point equipment is often called the Wi-Fi Access Point, but in the foregoing description, "access point" is used generically, regardless of whether the access network is Wi-Fi.

In this embodiment, a specific device (e.g., a device identified by a specific MAC address) is permitted to connect only to specific access points in the access network. In addition, the specific access points may be configured to only allow connections to nearby devices. The range limitation between the device and the access point may be configured on the access point for a specific device, when the access technology can provide an estimate of the distance from the device to the access point, or of the signal strength from the device to the access point.

FIG. 10 shows a factory with a Wi-Fi access network. In this example, there are three devices in the factory: device 1 (which uses highly secure authentication), device 2 (which uses weak authentication) and device 3. There may be rogue devices outside of the factory that attempt to connect to the Wi-Fi access network by impersonating device 2. Wi-Fi Access Point A could be configured to deny access from device 2, because the access request might be from a rogue device attempting to impersonate device 2 because the rogue devices are roughly the same distance away. Wi-Fi Access Point B could be configured to use low signal power so the rogue devices would be out of range, but that might result in a poor connection to device 3. Using the present invention, to avoid providing security credentials to a rogue device, Wi-Fi Access Point B would not be required to use low signal power. Instead, using location and signal strength information known to the Wi-Fi Access point, it may be configured to only allow access by device 2, but only if device 2 is nearby, or only if device 2 is sending a strong signal.

What is claimed is the following:

1. A system for enabling one or more devices that do not use core-network-acceptable security credentials for authentication to connect to a cellular core network, comprising:
   one or more devices;
   one or more gateways; and
   an access network to connect the devices to a core network;
   wherein the one, or more gateways determines whether the one or more devices possesses core-network-acceptable security during an authentication procedure for determining whether the one or more devices are permitted to connect to the core network, provides core-network acceptable security credentials for authentication on behalf of the one or more devices in the case where the one or more devices does not include core-network acceptable security credentials during the authentication procedure, and performs NAS signaling to have the core network authenticate and use the authentication results to later authorize the appropriate network capabilities on behalf of the one or more devices, the one or more devices performing standard authentication with the access network without participating in any authentication procedure with the core network.

2. The system of claim 1, the one or more gateways causing one or more discrete data paths in the access network for data traffic of one or more devices, and a specific QoS to be established on one or more of the discrete data paths in the access network.

3. The system of claim 1, the one or more gateways causing one or more discrete data paths in the data network for data traffic of one or more devices, and a specific QoS to be established on one or more of the discrete data paths in the data network.

4. The system of claim 1, the one or more gateways causing to be prevented, the access by one or more devices to data network servers or services, according to the authorization policy returned by the core network.

5. The system of claim 1, wherein the core network returns an accounting policy for the one or more devices, and the accounting policy is activated or caused to be activated by the one or more gateways.

6. The system of claim 1, the one or more gateways disconnecting one or more devices from the cellular core network.

7. The system of claim 1, the one or more gateways determining that one or more devices do not have viable connections to the access network.

8. The system of claim 7, the one or more gateways disconnecting said devices without viable connections from the core network.

9. The system of claim 7, the one or more gateways determining to not disconnect said devices from the core network, when the one or more gateways determines that connections to the access network for said devices have become viable before a timer expires, said timer starting when the one or more gateways determined that the connections to the access network were not viable.

10. The system of claim 1, wherein the one or more gateways uses security credentials available to the one or more gateways when providing core-network acceptable security credentials on behalf of the device.

* * * * *